United States Patent [19]

Crosby

[11] E Re. 30,941

[45] Reissued May 25, 1982

[54] SEAT BASE RAIL CONNECTOR AND ASSEMBLY

[75] Inventor: Lawton H. Crosby, Lake Bluff, Ill.

[73] Assignee: Morley Furniture Spring Corp., Lake Bluff, Ill.

[21] Appl. No.: 178,835

[22] Filed: Aug. 18, 1980

Related U.S. Patent Documents

Reissue of:

[64] Patent No.: 4,157,173
Issued: Jun. 5, 1979
Appl. No.: 865,966
Filed: Dec. 30, 1977

[51] Int. Cl.[3] ..... F16F 3/02
[52] U.S. Cl. ..... 267/110
[58] Field of Search ..... 267/97, 101, 110-112

[56] References Cited

U.S. PATENT DOCUMENTS 3,334,887 8/1967 Slominski ..... 267/110

*Primary Examiner*—Duane A. Reger
*Attorney, Agent, or Firm*—Richard G. Lione

[57] ABSTRACT

A rail connector and improvement in seat base support assembly. The connector takes two basic forms. In the first a pre-stressed, close wound coil, disposed either transversely or longitudinally of the connector, is effective to continuously bias the seat base support means upwardly. In the second a cantilevered, curved spring arm serves the same purpose. The connector may be configured to reach into the body of a sinuous spring band, for example, and define a torque arm in the band, at the back rail. All forms are applicable to wire mesh, chord rubber webbing, flat steel bands and sinuous, both arced and dearced.

4 Claims, 9 Drawing Figures

FIG. 1
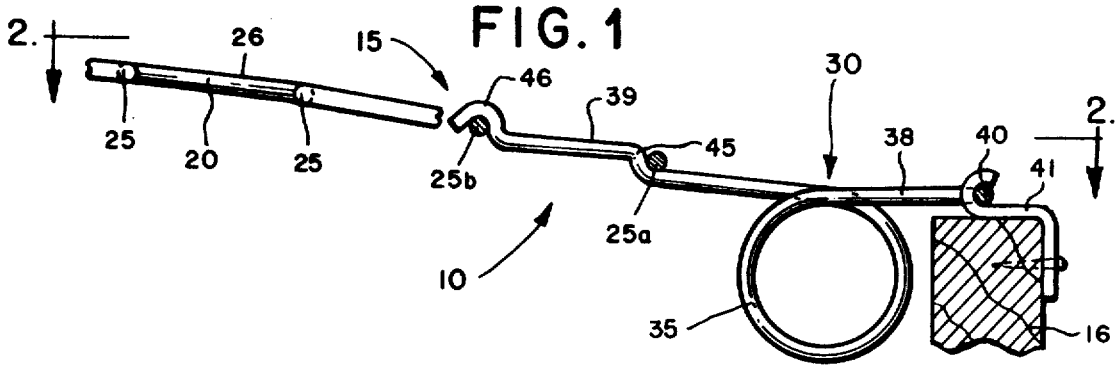
FIG. 2
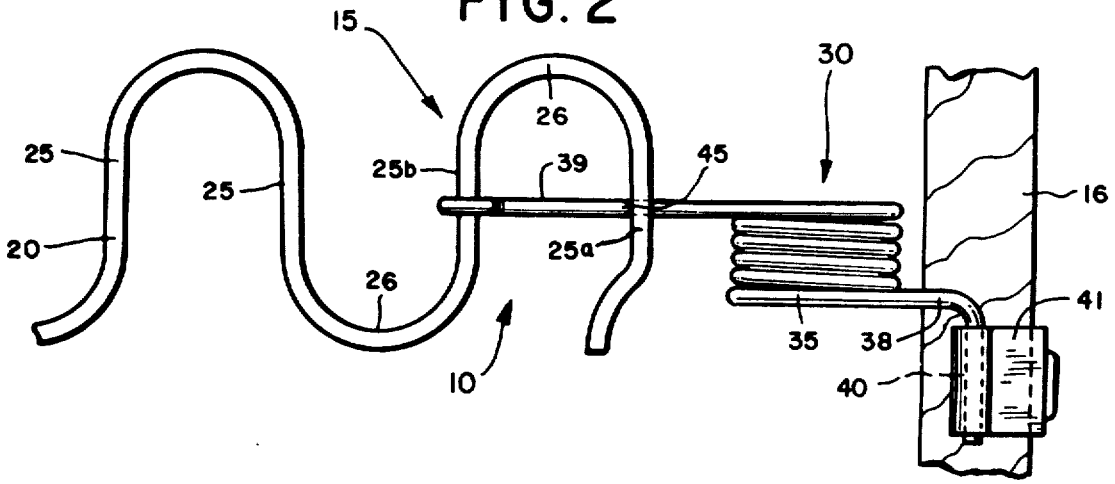
FIG. 3
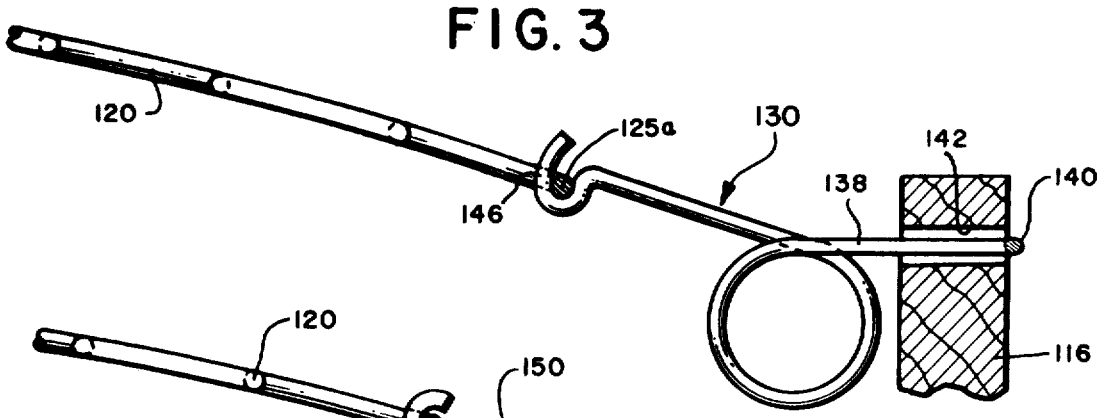
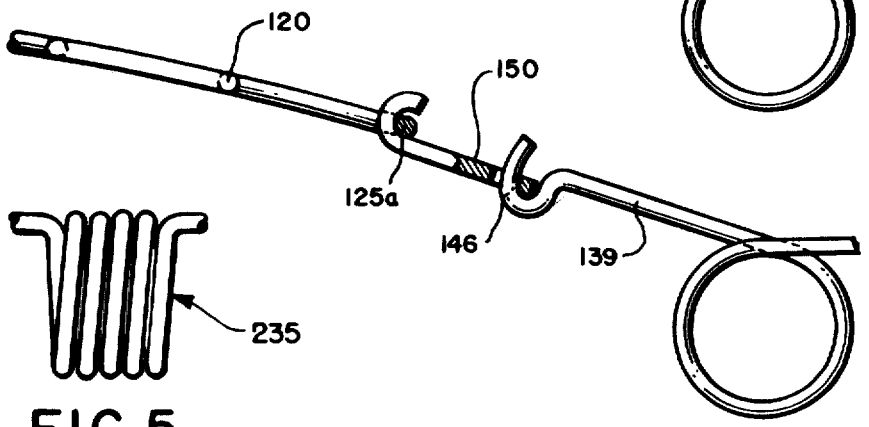
FIG. 4
FIG. 5

SEAT BASE RAIL CONNECTOR AND ASSEMBLY

Matter enclosed in heavy brackets [ ] appears in the original patent but forms no part of this reissue specification; matter printed in italics indicates the additions made by reissue.

FIELD OF THE INVENTION

This invention is in the field of seat base support assemblies. It relates to seat base support assemblies for furniture or the like wherein the support assemblies employed are of the non-coil spring type; i.e., they comprise sinuous spring bands, wire grids or chord-rubber webbing, or are made up of flexible steel bands. The invention finds particularly advantageous application to sinuous band seat spring assemblies, however, and is discussed initially in that context.

BACKGROUND OF THE INVENTION

Over the past ten to twelve years furniture seat spring torsioning devices such as disclosed in U.S. Pat. No. 3,210,064, No. 3,388,904, and No. 3,525,514, met the industry's long sought need for deep-drop uplift at the back rail and also contributed in other ways to the luxury seat which evolved during that time frame. As eleven (11) gauge helical spring connectors became disproportionally more expensive during this period these devices have been used almost exclusively with SWING ANCHOR connecting links and radius links such as disclosed in U.S. Pat. No. 3,790,149, and depended upon kinetic energy stored in the arced sinuous spring itself to produce all upward resilience. The upholstered furniture styles most widely sold at the time developed all the back rail uplift considered desirable using such connecting links.

During the past three to four years, however, there has been a move toward the use of thicker and thicker cushions. Attractive new and thicker cushion materials, including foam rubber laminates, have necessitated the lowering of seat frame heights dramatically. As a result, an urgent need was created in such constructions for more upward resilience of a strong dynamic nature in the spring base.

SUMMARY OF THE INVENTION

An object of the present invention is to provide a new and improved rail connector for sinuous spring bands, wire grids, chord-rubber webbing, and flexible steel bands.

Another object is to provide a rail connector which embodies the salutary features of conventional helical spring connectors while retaining essentially none of the undesirable features thereof.

Still another object is to provide a rail connector which produces spring torsioning and dynamic uplift at the back rail through kinetic energy which it itself stores, and which then cooperates with any spring action in the seat base support assembly, which might be sinuous, arced, or de-arced, a wire grid, chord-rubber webbing, or flexible steel bands.

Yet another object is to provide such rail connectors which give varying degrees of dynamic uplift resilience obtained by offering alternative spring action modes within themselves.

The foregoing and other objects are realized in accord with the present invention by producing two related forms of rail connector. A first form uses pre-stressed, close wound coil spring with attachment arms. In one alternative the coil spring is wound on an axis transverse to the axis of spring expansion and contraction while in another alternative the coil spring is wound on an axis longitudinally arranged relative thereto. In either alternative the connector may selectively have a leverage-amplified torsioning capability.

A second form uses a pre-stressed, cantilever spring configuration. This connector may selectively be used with a sinuous spring band having leverage-amplified torsioning incorporated therein.

The invention for the first time provides seat spring-enhancing connectors that in themselves combine the four essential seat-force-generators; i.e., (1) torsioning; (2) dynamic uplift; (3) expansion-contraction; and (4) leverage-amplification. These, in turn, produce to the greatest degree the four most desired seat-performance characteristics; i.e., (1) initial-drop; (2) deep-drop; (3) softness without "oil canning", "bucketing", "jack-knifing", or "bottoming"; and (4) resilient uplift proportionate to load.

BRIEF DESCRIPTION OF THE DRAWINGS

The invention, including its construction and modes of operation, together with additional objects and advantages thereof, is illustrated more or less diagrammatically in the drawings, in which:

FIG. 1 is a vertical sectional view through a portion of the back end of a furniture seat spring base, illustrating a spring band assembly including a first form of rail connector embodying features of the present invention;

FIG. 2 is a view taken along line 2—2 of FIG. 1;

FIG. 3 is a view similar to FIG. 1 illustrating one modification of the first form of rail connector embodying features of the invention;

FIG. 4 is a view similar to FIG. 1 illustrating another modification of the first form of rail connector embodying features of the invention;

FIG. 5 is an enlarged view of a portion of an alternative first form of rail connector embodying features of the invention;

DESCRIPTION OF THE PREFERRED EMBODIMENTS

Figure 6:
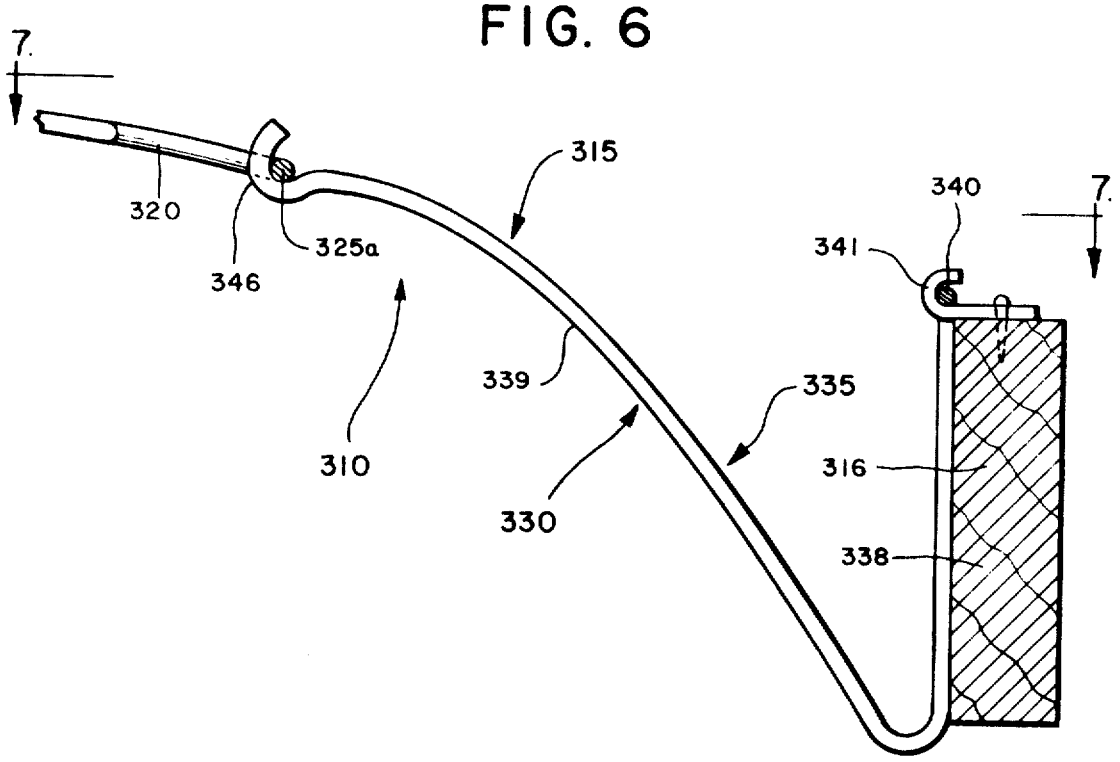
FIG. 6 is a view similar to FIG. 1 illustrating a second form of rail connector in a spring band assembly embodying features of the invention.

Referring now to the drawings, and particularly to FIGS. 1 and 2, a portion of the back end of a furniture seat base is illustrated generally at 10. The seat base 10 comprises spring band assemblies 15, only one of which is shown, extending in parallel relationship between the front rail (not shown) and back rail 16 of the base frame. Each assembly 15 includes a normally arced sinuous spring band 20 of standard loop size; i.e., a seven-eighths ($\frac{7}{8}$) inch interval between linear segments 25 and semi-circular segments 26 ofthe band. Each band 20 is connected to the back frame rail 16 by a first form of rail connector 30 embodying features of the invention.

The rail connector 30 is fabricated of eleven (11) gauge wire, similar to standard helicals. It comprises a section 35 of three coils tightly wound on an axis transverse to that of the band 20 and the axis of expansion and contraction of the connector 30.

Extending from the coil section 35, at their uppermost extremity, tangent to the arc of the coils and in opposite directions, are a rail-attachment leg 38 and a spring-attachment leg 39. The rail-attachment leg 38 terminates in a transversely disposed anchor section 40 which seats in a conventional "G" clip 41, while the spring-attachment leg 39 seats on and grips the spring band 20.

The spring attachment leg 39 is inclined slightly upwardly from the horizontal, in contrast to the rail-attachment leg 38, and includes an upwardly formed shoulder 45 and a terminal hook 46. The shoulder is formed approximately mid-way between the hook 46 and tangency with the coil 35, seven-eighths ($\frac{7}{8}$) inches each way in the case where the band 20 is regular sinuous.

As seen best in FIG. 1, the downwardly opening hook 46 is designed to seat over the penultimate linear segment 25b in the spring band 20, while the ultimate linear segment 25a seats against the shoulder 45. The result is to lock the end of the band 20 and the connector 30 together.

In operation, the attachment-arm 39 reaching up into the band 20 sets up a torsioning effect in the back of the band. The arm 39 is spring loaded upwardly by the strength of the coil section 35 and produces dynamic uplift. At the same time the coil section 35 permits of longitudinal expansion-contraction of the connector 30. The coil section 35 and rail-attachment leg 38 extending outwardly of the band 20 end amplify the leverage induced torque.

In an alternative construction of the first form of the invention, as seen in FIG. 3, the rail connector 130 is attached to the rail 116 through a gang bore 142. The rail-attachment leg 138 of the connector has a shorter anchor section 140 which can pass through the bore 142 from front to back of the rail 116 and then seats against the back of the rail to lock the connector 130 to the rail.

The spring-attachment leg 139 in this form of the connector is much shorter and has an upwardly formed hook 146 at its inner end. The hook 146 is so formed that when it seats upwardly, onto the ultimate linear segment 125a of the spring band 120, it cannot slip off during seat base operation.

The connector 130 provides both dynamic uplift and resilient expansion-contraction at the band end. It does not induce torsion or leverage amplification.

The connector 130 can also be connected to the ultimate linear segment 125a of the band 120 by a conventional VLE clip, as seen at 150 in FIG. 4. As such, the single spring attachment leg 139 obtains a wider purchase area on the band 120 end. The effect is to enhance lateral stability of the spring band assembly.

Turning now to FIG. 5, a modified coil section for a connector otherwise identical to that hereinbefore discussed is illustrated at 235. As illustrated, the coil section 235 is tightly wound in five (5) coils on an axis longitudinally aligned with the sinuous spring band span (not shown). This form of the connector 130 produces the same salutary effects, the dynamic uplift being produced by a torquing expansion-contraction of the coil section 235 in contrast to the loop compression-expansion of the coil section 35, however.

Figure 7:
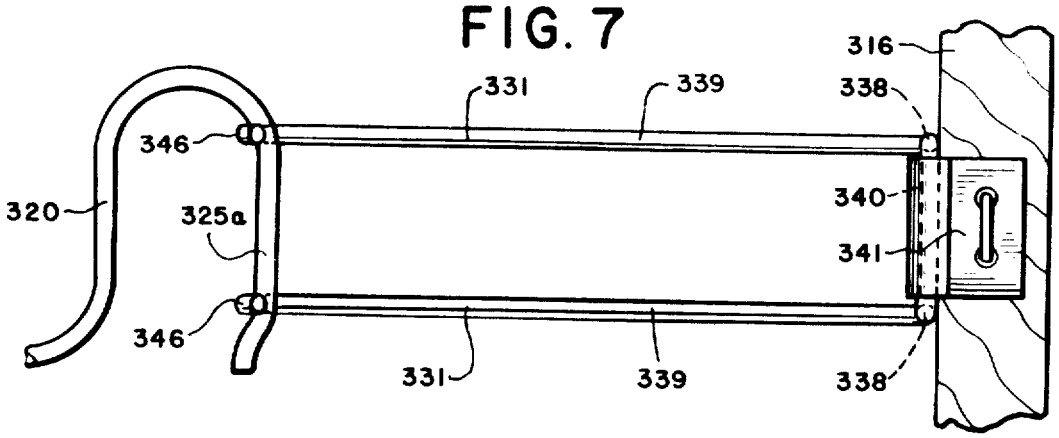
FIG. 7 is a view taken along line 7—7 of FIG. 6.

FIGS. 6 and 7 illustrate a portion of a furniture seat base 310 comprising spring band assemblies 315 (only one shown) in which a second form of spring band 320 connector is illustrated at 330. The connector 330 uses a cantilever principle to provide dynamic uplift to the band 320 at the back rail 316.

The rail connector 330 is fabricated of spring steel wire of relatively heavy gauge; i.e., eight (8) gauge or heavier. As best illustrated in FIG. 7, it includes a pair of identical connector arms 331 extending parallel to each other between the rail 316 and the band 320.

As seen once again in FIG. 6, each connector arm 331 includes a generally V-shaped body 335 made up of a rail-attachment leg 338 and a spring-attachment leg 339. The legs 338 are vertically oriented and preferably four (4) inches long. The legs 338 are joined at their upper ends by a base leg 340 which seats in a conventional EKS clip 341 stapled to the top of the rail 316.

Curving upwardly and inwardly from the lower end of each rail-attachment leg 338 is a corresponding spring-attachment leg 339. The spring-attachment legs 339 are approximately eight (8) inches long.

Formed on the free ends of the legs 339 are attachment hooks 346 identical to the hooks 146 hereinbefore discussed. The connector 330 is a variation of the second form of the invention wherein the hooks 346 receive and seat on the ultimate linear segment 325a of the spring band 320.

In operation the legs 338 are braced against the rail 316 with the spring-attachment legs 339 extending inwardly and upwardly therefrom to the hooks 346. In unloaded position the hooks are disposed approximately one (1) inch above the level of the EKS clip 341. The connector 330 thus is effective to dynamically urge the spring band 320 end upwardly when a subject is seated. At the same time longitudinal resilient expansion-contraction can and does take place in the connector 330, enhancing seat base softness.

Figure 8:
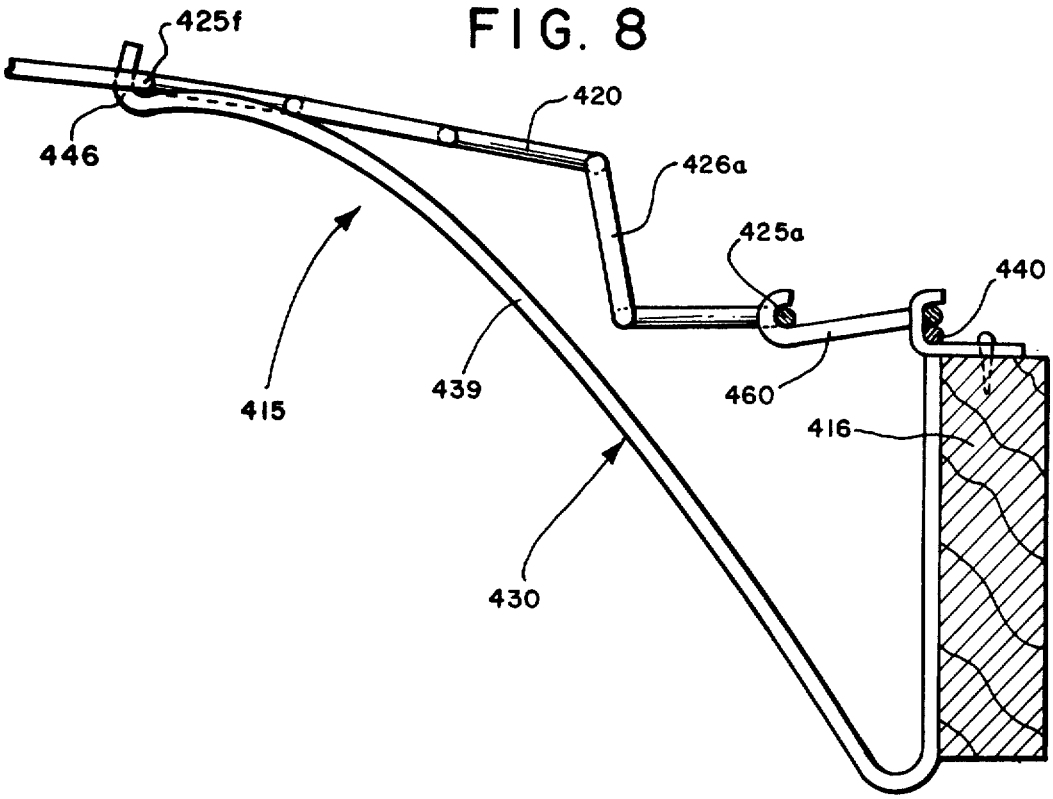
FIG. 8 is a view similar to FIG. 7 illustrating the second form of rail connector in a sinuous spring band assembly embodying features of the invention.

FIG. 8 illustrates a sinuous spring band assembly 415 which incorporates a connector 430 identical to the connector 330 hereinbefore discussed.

In the spring band assembly 415 the connector hooks 446 are seated on a linear segment 425f of the band 420 which is sixth from the end of the band; i.e., the ultimate linear segment 425a. The linear segment 425a is connected to the rail by a SWING ANCHOR connector clip 460 such as illustrated in FIG. 1 of the aforementioned U.S. Pat. No. 3,790,149. The base of the clip 460 is seated, together with the base leg 440 of the connector 430, in the conventional EKS clip stapled to the top of the rail 416.

The spring band 420 immediately inwardly of its ultimate linear segment 425a, at the penultimate linear segment, is bent upwardly for the length of one semicircular band segment 426a and then bent back into the normal arc of the band. This creates a torsion inducing moment arm configuration in the end of the band as illustrated at FIG. 12 in the aforementioned U.S. Pat. No. 3,525,514.

In operation of this spring band assembly 415 the connector 430 performs the same functions as previously ascribed to the connector 330. Further, however, its dynamic uplift is effected inwardly of the band end. This uplift, coupled with the torsion inducing band 420 configuration and the articulate connection provided by the clip 460 produces a highly sophisticated and luxurious seat base.

Figure 9:
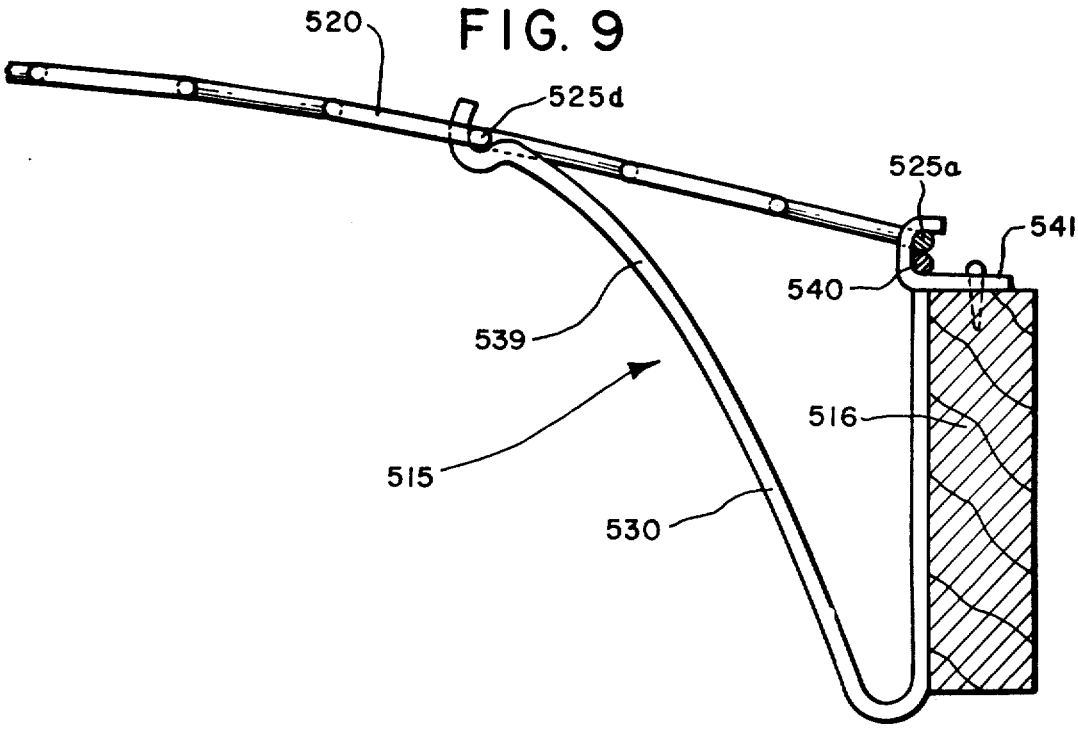
FIG. 9 is a view similar to FIG. 7 illustrating the second form of rail connector in another sinuous spring band assembly.

FIG. 9 illustrates a sinuous spring band assembly 515 which also incorporates a connector 530 identical to the connector 330 hereinbefore discussed. In the assembly 515 the sinuous band 520 is a de-arced band, however; i.e., it *has a considerably flatter arc than "normally arced" sinuous and thus* has very little inherent upward resilience. In this assembly the connector 530 pre-loads the band 520 upwardly at the fourth linear segment 525d from the ultimate linear segment 525a.

The ultimate linear segment 525a is seated in the EKS clip 540 on the rail 516, together with the base leg 540 of the connector 530. The connector leg 539 thus preloads the band 520 upwardly with the seat base 10 in its relaxed state as a subject is seated and rises, the connector provides a dynamic uplift which would otherwise not be present.

All of the connectors hereinbefore discussed are also used to connect other forms of seat base support means to the frame rails. As will readily be understood, wire grids such as manufactured under the trademark PERMA-MESH by Flexolators, Inc., chord-rubber webbing such as manufactured by the Pirelli, s.p.a., of Italy, and flat steel bands, for example, do not have stored upward resilience in the sense that arced sinuous spring bands do. When connected to the back frame rail by connectors embodying the inventions disclosed herein, however, they are provided with a dynamic uplift adjacent the back rail. In this sense they are similar to a [de-arced] *non-arced* sinuous spring band.

*It should be noted here that normally arced, de-arced and non-arced sinuous have been referred to. Each of the first two has an arc to it; de-arced merely have a substantially lesser degree of arc. Non-arced sinuous, on the other hand, has no arc inherently built into it at all, as illustrated by the Slominski U.S. Pat. No. 3,334,887, for example.*

While several embodiments described herein are at present considered to be preferred, it is understood that various modifications and improvements may be made therein, and it is intended to cover in the appended claims all such modification and improvements as fall within the true spirit and scope of the invention.

What is desired to be claimed and secured by Letters Patent of the United States is:

1. In a [furniture] seat base including a frame having afront rail and a back rail and a plurality of sinuous spring band assemblies disposed between said rails, the improvement in a sinuous spring band assembly, comprising:

a. [a normally] *an* arced sinuous spring band comprising a plurality of generally linear wire segments interconnected by a plurality of generally semi-circular wire segments connected to the front rail and extending into close proximity with the back rail, and b. a rail connector connecting said band to the back rail, c. said rail connector including coil spring means for storing energy and having a rail attachment leg extending from one end thereof and a spring attachment leg extending from the other end thereof, d. said coil spring means being effective to resiliently oppose downward movement of said spring attachment leg relative to said rail attachment leg, e. said rail attachment leg being connected to the back rail with said coil spring means spaced from said back rail whereby the coil spring means will not come into engagement with the rail during vertical travel of the seat spring assembly under load *or, at least, will not come into engagement with the rail until a substantial amount of vertical travel has taken place,* f. said spring attachment leg being connected to said band.

2. The improvement in a sinuous spring band assembly of claim 1 further characterized in that:

a. said rail attachment leg is connected to said back rail by pivot means which permit vertical pivoting of said connector about a horizontal axis on the rail.

3. The improvement in a sinuous spring band assembly of claim 2 further characterized in that:

a. said spring attachment leg underlies the linear wire segment at the back end of said band and overlies a linear wire segment inwardly of the back end of said band so as to exert a torque effect ending to flatten the arc of said normally arced band.

*4. In a furniture seat base including a frame having a front rail and a back rail and a seat base support means disposed between said rails, the improvement in a seat base support assembly,comprising:*

*(a) a seat base member connected to the front rail and extending into close proximity with the back rail,*

*(b) a rail connector connecting said member to the back rail,*

*(c) said rail connector including coil spring means for storing energy and having a rail attachment leg extending from one end thereof and a spring attachment leg extending from the other end thereof,*

*(d) said coil spring means being effective to resiliently oppose downward movement of said spring attachment leg relative to said rail attachment leg,*

*(e) said spring attachment leg being connected to said member,*

*(f) said rail attachment leg being connected to the back rail with said coilspring means spaced from said back rail whereby the coil spring means will not come into engagement with the rail during vertical travel of the seat base support assembly under load or, at least, will not come into engagement with the rail until a substantial amount of vertical travel has taken place.*

* * * * *